Figure 1:
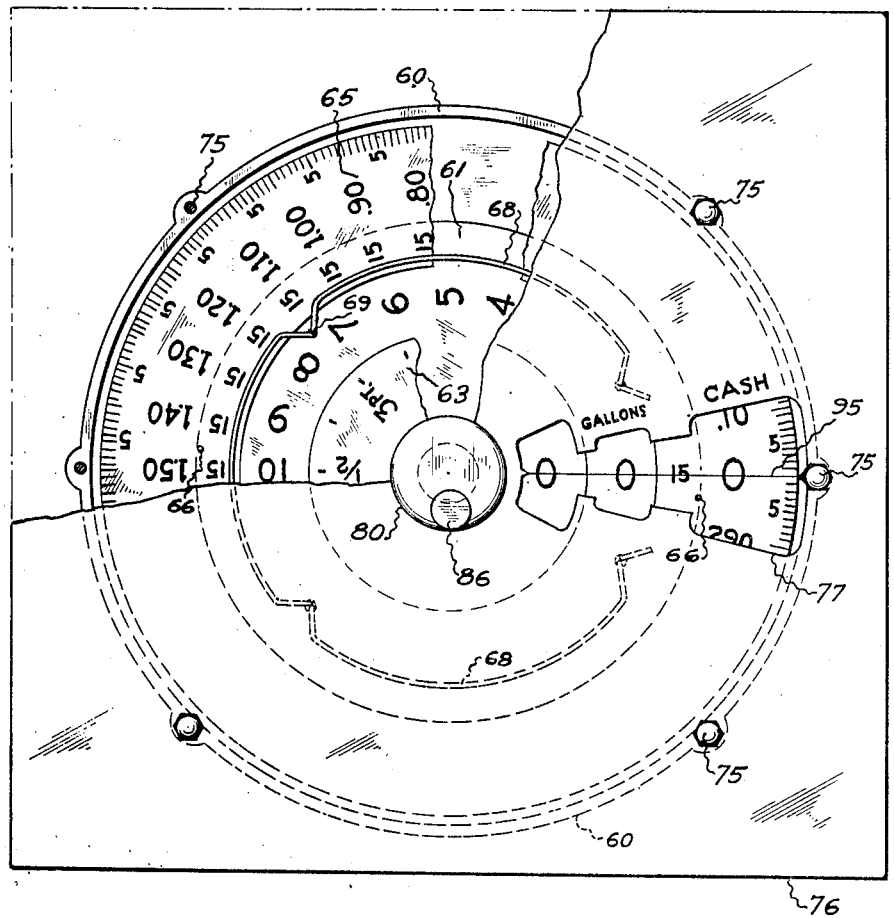

March 7, 1944.    W. E. MILESTONE ET AL    2,343,385
CALCULATING MEANS
Filed Oct. 15, 1941    4 Sheets-Sheet 1

INVENTORS
WALTER E. MILESTONE
BY    BRENNAN B. WEST

ATTORNEYS.

INVENTORS
WALTER E. MILESTONE
BRENNAN B. WEST
BY
ATTORNEYS.

March 7, 1944.  W. E. MILESTONE ET AL  2,343,385
CALCULATING MEANS
Filed Oct. 15, 1941   4 Sheets-Sheet 3

INVENTORS
WALTER E. MILESTONE
BRENNAN B. WEST
BY
ATTORNEYS.

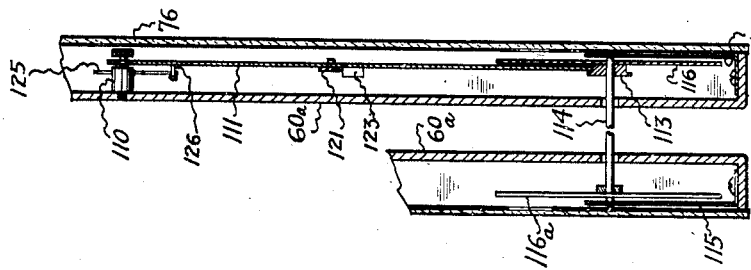
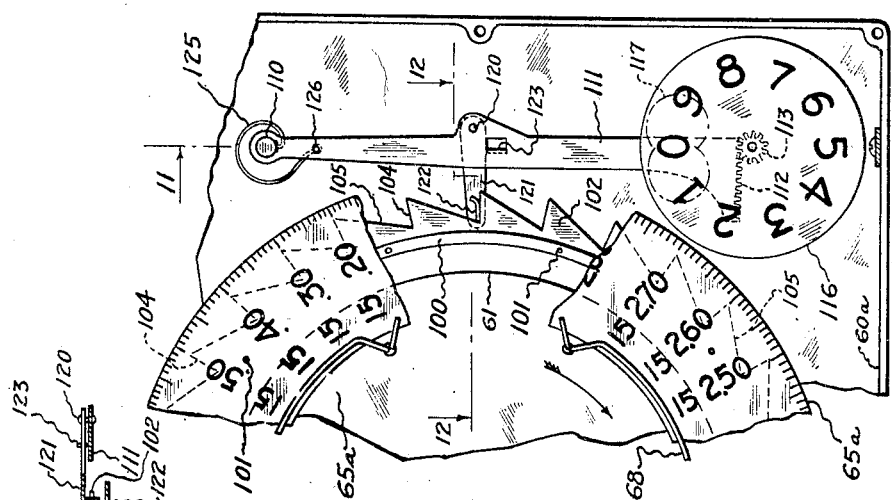
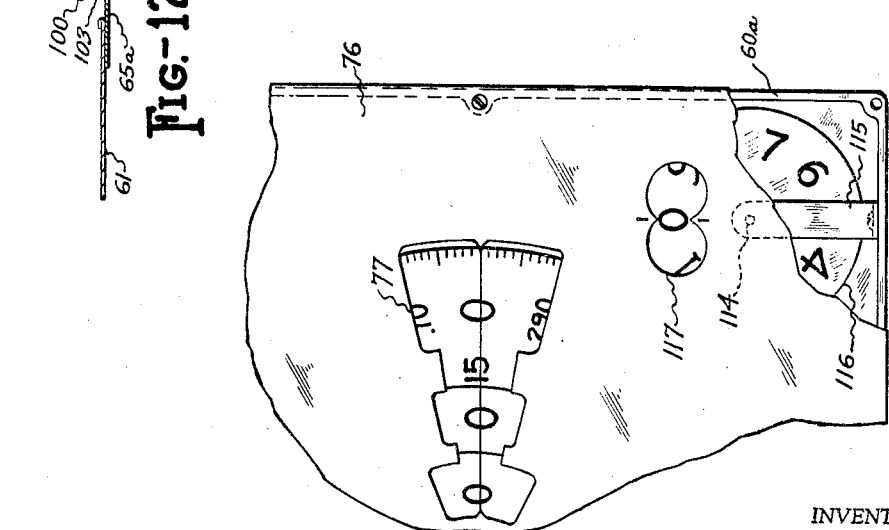

Patented Mar. 7, 1944

2,343,385

UNITED STATES PATENT OFFICE 2,343,385

CALCULATING MEANS

Walter E. Milestone, Lakewood, and Brennan B. West, Cleveland, Ohio; said West assignor to said Milestone Application October 15, 1941, Serial No. 415,054

6 Claims. (Cl. 235—134)

This invention relates to indicators for incorporation in metering pumps, such as are used in filling stations, for indicating the quantity and price of gasoline dispensed.

The invention is intended as a thoroughly satisfactory substitute for the more complicated and costly computers incorporated in pumps of the class referred to, wherefore the general objects are the attainment of simplicity of construction, economy of manufacture, durability, and reliability, in indicators of the kind in question.

A further and important object of the invention is to provide a construction enabling the prevailing clock type gasoline measuring pumps to be converted, with minimum change and at little expense, into computing pumps that indicate both quantity and price of the gasoline dispensed.

According to our invention, in its present preferred form, different price rings are adapted to be interchangeably attached to a quantity or gallons disk or dial in order to take care of price changes, and a further purpose of the invention is to provide means whereby a price ring may be quickly and conveniently attached to said disk or dial in accurate relation thereto, and as readily detached therefrom. Except where a feature is incorporated that would prevent doing so, as will hereinafter more fully appear, our invention contemplates reversal of the price rings so that indications of different prices may be borne by the opposite sides of the same ring, thereby reducing to half, the number of rings otherwise required to take care of a given price range. The aforesaid attaching means permits of such reversal.

As the nucleus of our improved construction, we have adopted an approved mechanism that is common in the clock-type gasoline measuring pumps wherein a gallons hand is carried by an outer sleeve shaft, and a fractional gallon hand is carried by an inner shaft that rotates within the sleeve shaft and is driven at such a ratio to the latter that it makes a complete rotation while the sleeve shaft rotates through sufficient angle to swing the hand carried thereby from one gallon's graduation of a dial to the next. In adapting this mechanism to our improvements, we dispense with the hands and attach to the outer sleeve shaft a quantity and price disk or dial, the price indicia being preferably borne by a price ring that is attached to the quantity disk or dial, as above set forth, and a smaller disk or dial is attached to the inner shaft bearing indicia designating the fractions of a gallon. Although the penny graduations are disposed adjacent the edge of the larger dial or price ring, they are relatively small; and it is a further object of our invention to incorporate in the mechanism a simple means for clearly indicating, by indicia large enough to be readily visible at a distance, the number of pennies indicated at any time by the penny graduations of the price disk or ring.

With the increased weight of the disks, as compared to that of the hands, said disks have a tendency, due to their momentum, to override the zero position when the disks are reset to that position by a contrivance of the sort employed in the clock type indicators. A further object of our invention is to overcome this tendency by providing suitable reduction gearing in our resetting means or mechanism, while retaining the manner of manipulation of its predecessor to which the attendants of service stations are accustomed.

In the great majority of cases, indicators used with gasoline pumps are double faced so that the pumps may be located between driveways of filling stations and the indicators viewed from either side. It is essential that the dials appearing on the two sides or faces of the indicator be accurately related to each other. In the absence of means serving to correct the defect, there is enough play or backlash in the gears that provide the driving connection between the indicating parts adjacent the two sides or faces of the apparatus to permit of considerable variation between them. It is a further purpose of our invention to obviate this difficulty by providing rectifying means between the gearing adjacent the two sides or faces which acts to absorb the lost motion or play, the indicating parts being so adjusted with respect to this rectifying means that the readings on both sides or faces of the indicator are substantially alike at all times.

Figure 2:
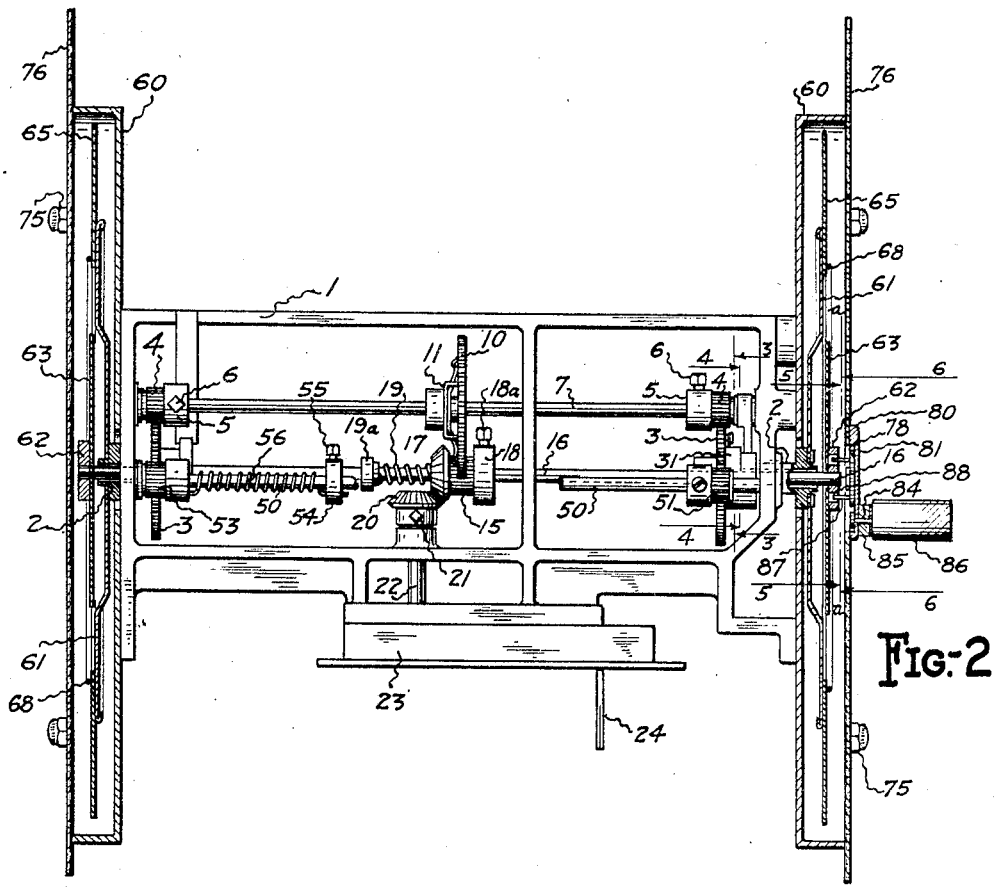
Figure 4:
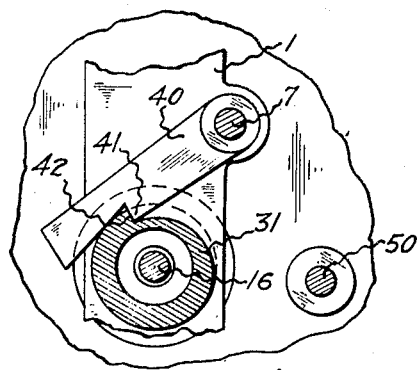
Figure 3:
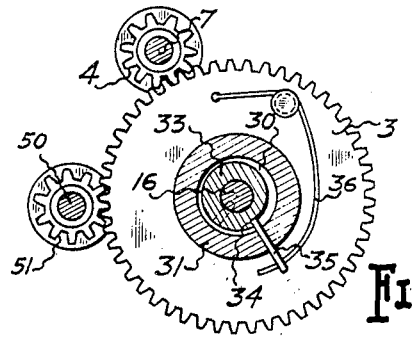
Figure 5:
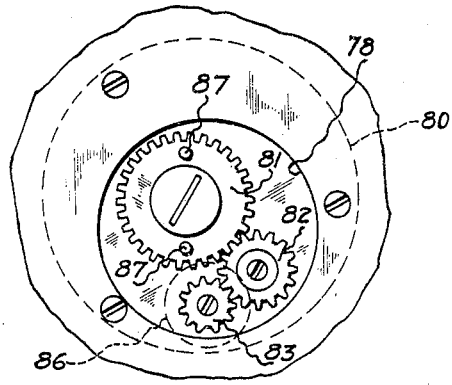
Figure 6:
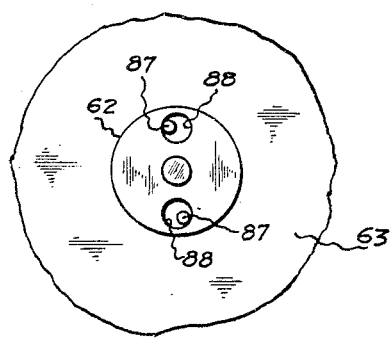
Figure 7:
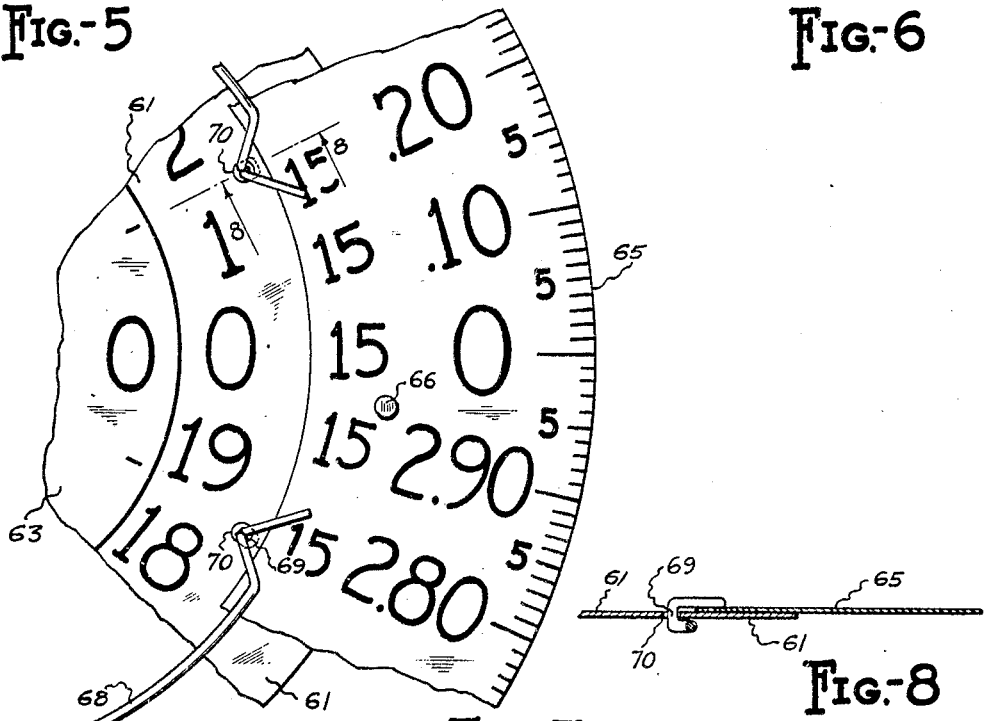
Figure 8:

The foregoing objects and advantages, with others hereinafter appearing, are attained in the embodiment of the invention illustrated in the accompanying drawings that form a part hereof and wherein Fig. 1 is a front elevation of an indicator constructed in accordance with the invention and showing parts broken away to reveal certain structural features; Fig. 2 is a side elevation, partly in central section, of the indicator shown in Fig. 1; Figs. 3 and 4 are sectional details on the respective lines 3—3 and 4—4 of Fig. 2, showing, in Fig. 3, the means for properly relating the outer sleeve shaft and inner shaft during the resetting operation to radially align the zero designations of the indicating parts carried by the respective shafts, and, in Fig. 4, the means for stopping the outer sleeve shaft when the indicating parts carried thereby are in zero position; Figs. 5 and 6 are sectional details taken on the line a—a of Fig. 2, and looking in the directions indicated, respectively, by the arrows 5, 5 and 6, 6, the former view showing, on a considerably enlarged scale, the reduction gearing of the resetting mechanism, and the latter, the pin drive connection between the same and the fractional gallon disk or dial; Figs. 7 and 8 are details of the retaining means for detachably securing the price ring to the quantity or gallons disk; Fig. 9 is a fragmentary front elevation of the indicator with auxiliary means incorporated therein for clearly showing the pennies part of a transaction; Fig. 10 is a view of the same with the face plate removed and parts broken away to better show the mechanism by which the penny dial is rotated, and Figs. 11 and 12 are sections on the respective lines 11—11 and 12—12 of Fig. 10.

As previously explained, our improved construction is built upon a time-tested and approved mechanism employed in the clock type indicators of gasoline measuring pumps, and no claim is laid thereto except as it enters, generally, into the combination involving our improvements. The mechanism, shown in Fig. 2, comprises a frame 1, in the opposite ends of which are journaled outer sleeve shafts 2 which have secured to their inner ends spur gears 3 that mesh with pinions 4 having integral extensions 5 that are fastened by set screws 6 to a shaft 7 whereon the pinions are mounted and that is journaled at its ends in the ends of the frame 1.

Also mounted on the shaft 7, about midway of its length, is a gear 10, the same having a firm but yielding driving connection with the shaft through a friction coupling 11 of common type. The gear 10 meshes with and is driven from a spur pinion 15 that is mounted on what we shall term the inner shaft 16 whose ends extend through and beyond the previously mentioned outer sleeve shafts 2. The pinion 15 is joined to a miter gear 17 and the unit comprising the two has a firm but yielding driving connection with the shaft 16 through friction means consisting of a collar 18 that is fastened to the shaft 16 by a set screw 18ª and against which said unit is urged by a relatively stiff spring 19 that is compressed between the unit and an abutment 19ª that is fixed to the shaft. The miter gear 17 meshes with a similar gear 20 that is fastened by set screw 21 to a vertical shaft 22. This vertical shaft is journaled in the bottom portion of the frame 1 and has driving connection, through suitable gearing (not shown) enclosed in a casing 23, with a drive shaft 24 that depends from said casing and is adapted to be coupled to the meter shaft of the gasoline dispensing measuring pump in the usual way.

With reference to the gear 3 that is located adjacent the right hand end of the frame 1, as the parts are viewed in Fig. 2, within a cavity 30 (Fig. 3) of the hub 31 thereof is a collar 33 that is fastened to the inner shaft 16, and adapted to cooperate with a radial shoulder 34 of said collar is the inner end of a plunger 35 that is slidable within a radial opening of the hub 31 and is urged inward by a spring 36 that is carried by said gear 3. The parts just described are those constituents of the resetting mechanism which serve to so relate the inner and outer shafts, during the resetting operation, that the zero designations of the indicating dials carried by the respective shafts are radially aligned. In Fig. 4 is illustrated the parts of said mechanism that are responsible for arresting return movement of the outer sleeve shafts when the indicating dials carried thereby reach zero position. These parts include a gravity pawl 40 that is pivoted, incidentally, on the adjacent shaft 7, and has a tooth 41 arranged to be engaged by a radial shoulder 42 on the hub portion 31 of the adjacent gear 3.

All parts so far described are common in the clock type indicators of well known gasoline measuring pumps and it is evident from the construction described that when the driving shaft 24 is rotated by the meter shaft of the pump, its motion will be transmitted through the gearing (not shown) that is housed in the casing 23 to the vertical shaft 22. As the shaft 22 is rotated, it will drive, through the miter gears 20 and 17, the shaft 16, and through the pinion 15 and gear 10, the shaft 7 at a considerably reduced speed with respect to that of the shaft 16, due to the difference in size of the pinion 15 and gear 10, the ratio, in the present instance, being one to ten. Rotation of the shaft 7 is transmitted at the same ratio through the pinions 4 and gears 3 to the outer sleeve shafts 2. By reason of the double reduction effected, first, through the pinion 15 and gear 10, and, secondly, through the pinions 4 and gears 3, the ratio between the inner shaft 16 and the outer sleeve shafts 2 is one to twenty. In other words, each time the inner shaft makes a complete rotation, one-twentieth of a rotation is imparted to the outer sleeve shafts.

In the resetting operation, as will hereinafter more fully appear, the inner shaft 16 is turned in a counter clockwise direction, as the parts are viewed in Fig. 3, and it, and the outer sleeve shafts 2, continue to rotate at the ratio aforesaid until the shoulder 34 on the collar 33, that is fastened to the shaft 16, engages the plunger 35. Thereafter the inner and outer shafts rotate together, which action continues until the shoulder 42 on the hub 31 engages the dog 40. Any movements of the parts during the resetting operation that are contrary to the action of the gearing involved are permitted by the friction coupling 11 and the friction means involving the spring 19.

In mechanisms of the sort above described, die cast and stamped gears and pinions are employed for the sake of economy, and in the use of such gears a certain amount of backlash or play is inevitable. Such relative motion between the dials on the two sides or faces of the indicator as would result from this backlash or play would be highly objectionable, as will be readily appreciated, especially when it is remembered that the penny graduations are relatively small, and any difference between the amounts shown on the opposite sides of the indicator would be likely to provoke arguments if not more serious trouble.

To obviate the foregoing difficulty, we incorporate in the mechanism a rectifying means which, in the present case, consists of a shaft 50, that is journaled at its ends in the end members of the frame 1, and to which is secured, near one of its ends, a pinion 51 that meshes with the adjacent gear 3. Meshing with the other gear 3 is a pinion 53 that is loosely mounted on the shaft 50. Surrounding the shaft 50, between said pinion 53 and a collar 54 that is secured to the shaft by a set screw 55, is a coil spring 56 that has one of its ends fastened to the pinion and its opposite end secured to the collar, the parts being so adjusted that said spring is constantly under tension. The resultant tendency for the pinions 51 and 53 to rotate in opposite directions, and their doing so to the extent permitted by the lost motion in the connections between the two gears 3, eliminates the backlash or play in the gearing and causes the two outer sleeve shafts 2, and consequently the dials carried thereby, to rotate with a practically invariable relationship between them.

As shown in Figs. 1 and 2, a shallow circular casing 60 is carried by each end of the frame 1 in concentric relation to the dial carrying shafts of the mechanism. Attached to the enlarged outer ends of the sleeve shafts 2 are disks or dials 61, and mounted on the extremities of the inner shaft 10, beyond said disks or dials 61, are the hubs 62 of smaller disks or dials 63, the latter being the ones previously referred to as the fractional gallon disks or dials, each being set off in fractions of a gallon, which, in some instances, are expressed in pints, as indicated in Fig. 1. The portions of the former disks or dials 61, immediately beyond the edges of the disks or dials 63, bear the gallons designations or indicia, as also appears from Fig. 1, and applied to the edge portions of the disks or dials 61 beyond the gallons designations or indicia, are price rings or charts 65. It is essential that the price rings bear a definite relation to the disks or dials 61, and to this end the latter are provided with pins 66 that fit within apertures in the price rings. To detachably connect the rings to the disks 61, and permit reversal of the price rings so that both sides may be used, we provide retainers consisting of spring wire rings 68 having inset hooked portions 69 (Figs. 7 and 8) that are adapted to be engaged through holes 70 in the disks 61 and, by reason of the expansion of the retainers, underlie the inner sides of the disks 61 outwardly of said holes 70. Segmental sections of the retainers between the hooks 69 overlie the inner edge portions of the price rings and hold the rings snugly against the disks 61.

As explained above, the disks or dials 63 are divided into fractions of a gallon, as apparent from the designations borne thereby, while the disks or dials 61 are divided into gallons graduations and are so marked. In the present case, each disk or dial 61 represents twenty gallons. Printed upon and in frequent repetition about the price rings, adjacent their inner edges, is the indication of the price per gallon at which the gasoline sells when such ring is in use. Substantially midway between their inner and outer edges, said rings are divided into dollars and dimes graduations and bear annular series of appropriate indications; and outwardly beyond the series of dollars and dimes indications are the five cent graduations, those midway between the dimes indications being designated by the numeral 5. Immediately adjacent the outer edges of the price rings, so that the spacing between them will be the maximum, are radial lines that indicate the pennies, as clearly appears from Fig. 1.

Applied to the open sides of the casings 60, and shown as held thereto by screws 75, are face plates 76 that desirably consist of sheets of transparent plastic. A window 77 is provided in each face plate 76 and, in the present instance, is formed by an unobstructed area of the transparent plastic material. In adapting the transparent plastic material to the purpose, the inner side of each of the face plates 76 has applied to it an opaque coating. According to our present preference, the opaque coating consists of a layer of flock of suitable material held to the plate by an adhesive, the window 77 being desirably produced by masking the area that forms it when the coating is applied. The face plate 76 at what may be considered the front of the indicator has an opening 78 opposite the central portion of the adjacent disk or dial 63 and slightly eccentric with respect thereto. Secured to the outer side of the face plate over said opening is a circular mounting 80 having a shallow recess on its inner side that accommodates a gear 81 (Figs. 2 and 5), an intermediate pinion 82, and a drive pinion 83 that is fastened to the rear end of a shaft 84 journaled in a hollow boss 85 of the mounting 80 and has applied to its outer end a knurled operating handle or knob 86. Pins 87 project rearwardly from the gear 81 and enter relatively large sockets 88 (Figs. 2 and 6) in the hub 62 of the adjacent fractional gallon disk or dial 63.

To facilitate reading the indicator, a suitable index is associated with each window 77 and, in the present instance, it consists of a relatively thin horizontal line 95, desirably of a color contrasting with that of the dials. By reason of the fact that the reading line is horizontal, and because indicators used in conjunction with gasoline pumps are practically always at about the eye level of the average person, only negligible variations are likely to occur in the alignment of the eyes of different observers with the indicia on the dials that are bisected by the lines 95.

Because of the smallness of the penny graduations, which makes them difficult of reading at a distance, we have provided the auxiliary penny indicator illustrated in Figs. 9 to 12. When this feature is incorporated in the apparatus, readable at each end of the indicator, a toothed annulus 100 is secured, as by rivets 101, to the rear side of each of a series of non-reversible price rings 65ª that are adapted to be attached, individually, to the disk or dial 61 by the retainer 68 above described. The body portion 102 of the toothed annulus 100 is offset rearwardly from the plane of a base flange 103 that engages the price ring, as best shown in Fig. 12; and the edge of said body portion is serrated to provide angular teeth having radial edges 104 and cam edges 105. According to the present embodiment, the radial edges 104 of adjacent teeth are spaced apart a distance corresponding precisely to that aggregating ten penny graduations of the price ring 65ª to which the annulus is attached, while said edges 104 of all annuli of a given series of price rings are exactly the same in length.

Loosely pivoted on the reduced front end of a post 110, that is attached to and projects forwardly from the rear vertical wall of the surrounding casing 60ª (which differs in size and shape from the formerly described casing 60 in that it may accommodate the mechanism now under consideration) is an arm 111 having a gear segment 112 at its lower end. This gear segment meshes with a pinion 113, fixed to the forward end of a spindle 114 that extends from end to end of the indicator and is mounted for rotation in brackets 115 preferably by having its ends sharpened and engaged in depressions of said brackets. Secured to the pinion 113 is a disk or dial 116 on the front face of which appear the ordinals 0 to 9 in a circular series, certain of which may be observed through the window 117 of the adjacent face plate 76. A similar disk or dial 116a is fastened to the opposite end of the spindle 114 in proper relation to a window in the corresponding face plate 76, the ordinals of the present disk or dial being reversed with respect to those of the other because, from the viewpoint of the observer, the dials rotate in opposite directions.

Pivoted at 120 to the arm 111 is a lever 121 that carries, adjacent its free end, a laterally extending lug 122 whose edge remote from the pivoted end of the lever is arranged to engage the cam edges 105 of the teeth of an annulus. The lever 121 is limited in its downward movement by a stop 123 that projects rearwardly from the arm 111. A hair spring 125, which has one of its ends attached to the post 119 and its opposite end connected at 126 to the arm 111, tends to rock said arm in a direction to maintain the lug 122 in engagement with the annulus 100, and as the disk or dial 61, with the price ring 65a secured thereto, is rotated in the direction indicated by the arrow in Fig. 10, as during a liquid dispensing operation, the cam edges 105 of the annulus 100 swing the arm 111 against the action of the spring 125 thereby to rotate the spindle 114 and the disks or dials 116 and 116a carried thereby and disclose through the smaller windows of the opposed face plates the penny indication corresponding to the one disposed in reading relation to the index lines 95 of the windows 77. Thus, when consulting the indicator in any transaction, if uncertainty is experienced with reference to the penny graduation involved, the correct reading may be confirmed by a glance at the windows of the auxiliary penny indicators.

As stated above, the length of the radial edges 104 of all annuli carried by the price rings of a given series is the same, regardless of the differences in price per gallon between the rings; whereas the length of the cam edges 105 of the annuli of price rings of different denominations of the same series, vary according to the difference in length of the dimes graduations (or the aggregate of ten penny graduations) of said rings. By reason of this, the dials 116 and 116a are always given exactly one rotation by each tooth of the annulus of any price ring selected, such rotation corresponding in duration to the movement of the price ring through precisely ten penny graduations. Therefore, notwithstanding the difference in price per gallon between the different rings, the rotation of the penny dials is properly coordinated with that of any selected price ring.

While we have described the teeth of the annulus 100 as corresponding in length to ten penny graduations of the price ring to which the annulus is attached, this may be varied if desired. Each tooth might correspond to a different number of penny graduations as, for example, fifty. In such a case, the ratio between the gear segment 112 and the pinion 113 would be correspondingly changed so that the dials 116 and 116a would be given five rotations for each tooth, instead of one. In view of the obviousness of such a modification, illustration is deemed unnecessary.

Furthermore, with the separate penny indicators incorporated in the apparatus, penny graduations could be omitted from the price rings or charts. In such a case the dollars and dimes reading would be taken from the price ring or chart, and the pennies reading from the adjacent penny indicator.

During the resetting operation of the form of apparatus incorporating the auxiliary penny indicators, when the dials 61 and 63 are rotated in a counterclockwise direction, the lug 122 on the arm 121 idles past the teeth of the annulus 100, the free end of the arm being lifted as each tooth passes and dropping to the next tooth.

Having thus described our invention, what we claim is:

1. In a price indicator, an indicating element bearing a series of dimes graduations, index means providing a reading place with respect to which said element is movable, mechanism for creating relative movement between the element and said index means in a price indicating operation, a second indicating element bearing pennies graduations, a second index means providing a reading place with respect to which the second indicating element is movable, a member movable with the first indicating element and having cam parts each corresponding in length to a given number of tenths of the dimes graduations of said first indicating element, and means operated by said cam parts for effecting relative movement between the second indicating element and the second index means in the ratio of ten penny graduations of the second indicating element to one dimes graduation of the first indicating element.

2. In a price indicator, a couple consisting of indicating means bearing dimes graduations, and an index device with respect to which said indicating means is movable, mechanism creating relative movement between the indicating means and said device in a price indicating operation, a second couple consisting of a dial bearing ordinals designating pennies, and an index device associated with said dial, and driving connections between said couples through which relative movement between said indicating means and the first mentioned index device, a distance corresponding to one-tenth of a dime, is translated into relative movement between the dial and the index device associated therewith corresponding to the distance between adjacent ordinals on the dial.

3. In a price indicator, a couple consisting of indicating means involving relatively small penny graduations, and an index device associated with the penny graduations of said indicating means, a second couple consisting of a dial bearing relatively large ordinals designating pennies, and an index device associated with the ordinals of said dial, mechanism creating relative movement between the indicating means and the first mentioned index device in a price indicating operation, and driving connections between said couples through which said relative movement is translated into corresponding relative movement between said dial and the second mentioned index device.

4. In a price indicator, a rotatable chart whose edge is concentric to its axis of rotation and bearing penny graduations adjacent its edge, a member rotatable with the chart and having cam edges corresponding in circumferential extent to ten penny graduations of the chart, a penny dial bearing ordinals designating pennies, an index device for cooperation with said ordinals, and means for creating relative movement between the index device and said dial, said means including a part cooperating with said cam edges whereby said means is actuated as the chart is rotated.

5. In a price indicator, a rotatable chart whose edge is substantially concentric to its axis of rotation, the chart being divided into penny graduations adjacent its edge, a toothed member carried by the chart, each tooth having a radial edge and a cam edge disposed at an angle to the edge of the chart and extending from the radial edge of one tooth to the radial edge of the next, the distance between the radial edges of adjacent teeth corresponding to ten penny graduations of the chart, movably supported means having a part engaging the teeth of said member so as to be moved by the cam edges of said member when the latter is rotated, a dial bearing ordinals from one to nine and nought, an index device associated with said dial, and connections through which the aforesaid means creates relative movement between the index device and dial, each cam edge of said member creating sufficient movement of said means to relatively move the index device and dial throughout the range of said ordinals.

6. In a price indicator, a movable chart bearing dimes graduations, an element movable in unison with said chart and having cam faces each corresponding to the distance between adjacent dimes graduations of the chart, and penny indicating means actuated by the cam faces of said element for indicating the consecutive penny valuations between the dimes graduations.

WALTER E. MILESTONE.
BRENNAN B. WEST.